United States Patent [19]

Livick

[11] 4,366,626

[45] Jan. 4, 1983

[54] RULING DEVICE FOR THE BLIND

[76] Inventor: Lester R. Livick, 15106 Beatty St., San Leandro, Calif. 94579

[21] Appl. No.: 209,675

[22] Filed: Nov. 24, 1980

[51] Int. Cl.³ .............................................. B43L 13/00
[52] U.S. Cl. ....................................... 33/435; 33/443; 33/494
[58] Field of Search ................................. 33/435-437, 33/443, 447, 494

[56] References Cited

U.S. PATENT DOCUMENTS

| Re. 24,927 | 1/1961 | Shelly | 33/435 X |
|---|---|---|---|
| 1,013,086 | 12/1911 | Winters | 33/443 X |
| 1,356,987 | 10/1920 | Ingle | 33/494 |
| 1,849,493 | 5/1932 | Larkin | 33/437 |
| 2,194,889 | 3/1940 | De Lisle | 33/443 |
| 2,562,479 | 7/1951 | Spikes | 33/443 |
| 4,047,304 | 9/1977 | Delre | 33/443 |
| 4,223,447 | 9/1980 | Greenless | 33/443 |

FOREIGN PATENT DOCUMENTS 692788  2/1932  France ................................ 33/443

Primary Examiner—Charles E. Phillips
Attorney, Agent, or Firm—Alvin E. Hendricson

[57] ABSTRACT

A board has indexed tracks along each side with parallel transverse bars having end feet riding in the tracks and a marker being laterally adjustable between successive like separated positions along the bars for setting a marking position on a sheet of paper mounted on the board by releasable retaining means to identify to a blind person the end of ruling or marking upon the paper. A disc is also mountable for rotation and angular indexing on the board with a crosspiece adapted to slide in the tracks carrying a rotatable arm with marking means adjustably positioned thereon for drawing circles and rectangles on paper mounted on the board.

3 Claims, 6 Drawing Figures

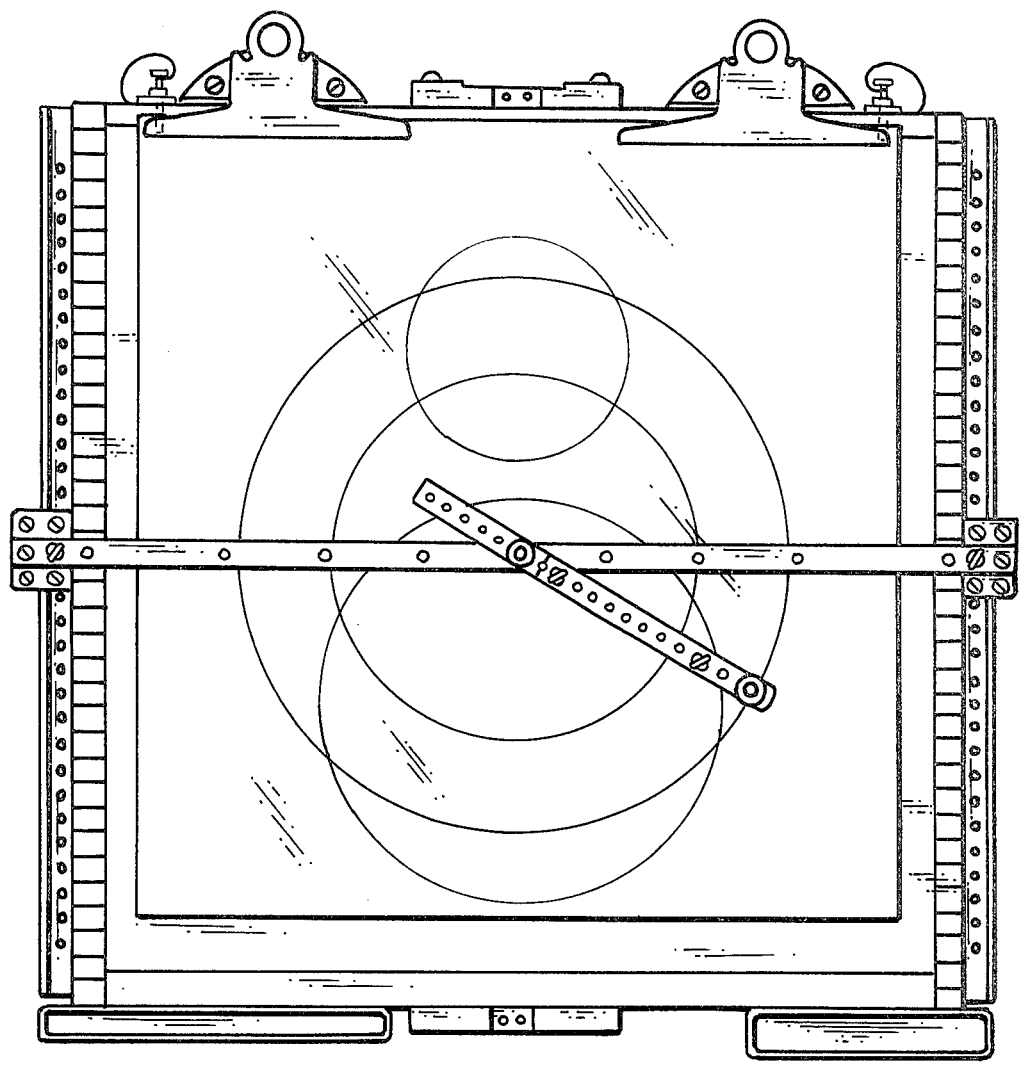
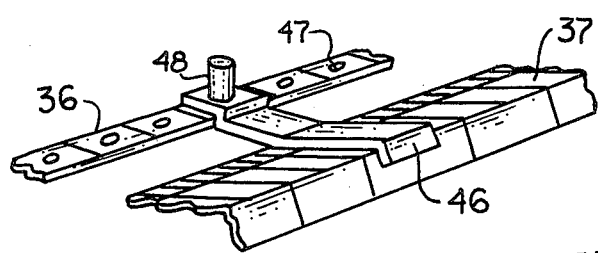
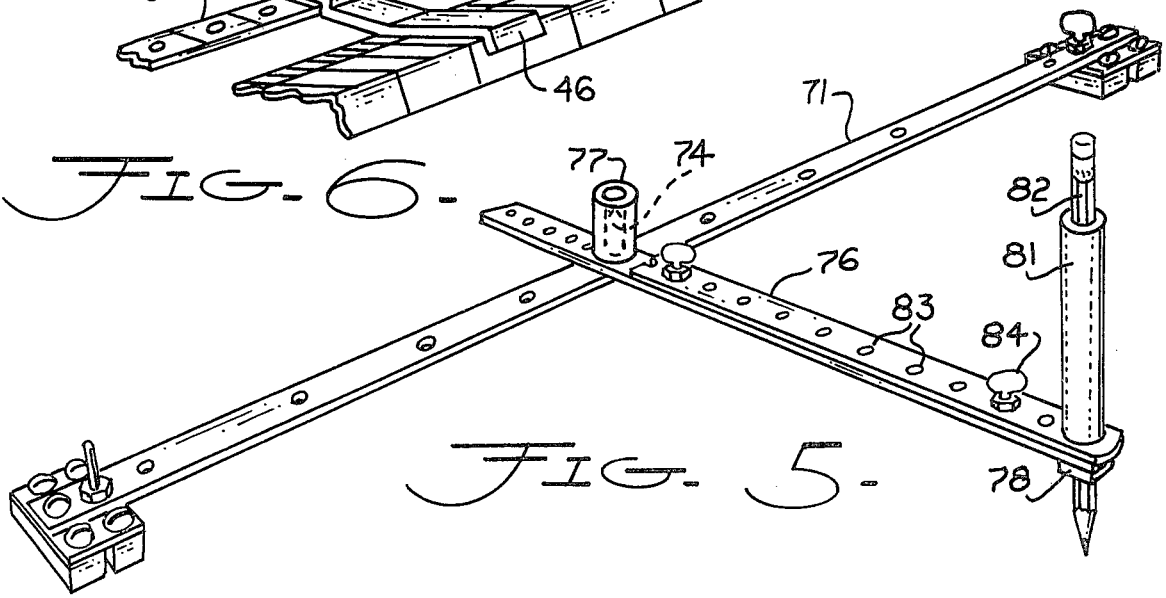

RULING DEVICE FOR THE BLIND

BACKGROUND OF INVENTION

Various devices have been developed to assist a blind person in signing checks, marking paper and the like in order to assist a person so handicapped in performing daily tasks. The present invention provides a further improvement in this field by assisting a blind person to locate particular portions of a sheet of paper such as a signature line or the end of prior writing, to rule or draw circles on a piece of paper and many other marking or writing operations.

SUMMARY OF INVENTION

The present invention basically comprises a writing or marking board having releasable paper retaining means for accurately positioning and holding one or more sheets of paper or the like on the upper surface thereof. Means are provided for holding the board in a comfortably tilted position on a horizontal surface such as a table or desk top and a pair of parallel tracks are provided one along each side of the board with laterally aligned physically identifiable indicia and releasable locking means therealong.

Upon the board there is provided a pair of parallel spaced bars terminating in feet adapted to slidably engage the tracks on the sides of the board and including movable portions of the releasable locking means for adjustably fixing the position of the bars on the board and thus on paper mounted thereon. Both of the bars have equally spaced indented marks along same so that a blind person can count marks from an edge of the board, for example, and a slide marker extends between the bars and is movable therealong between the marks thereon.

In addition to the foregoing, the present invention includes a flat disc adapted for rotatable mounting on the board in flat contiguous relation thereto. The disc has paper aligning means on the top surface thereof and quadrant indentations cooperable with side members that mount in the tracks along the side of the board. A crosspiece riding in the board tracks carries a rotatable arm having spaced locations for receiving marking means such as a pencil or the like. Various different marking and drafting operations may be precisely performed by a blind person with the disc, crosspiece and rotatable arm.

BRIEF DESCRIPTION OF FIGURES

The present invention is illustrated as to a single preferred embodiment in the accompanying drawings, wherein:

FIG. 4 is a top plan view of the device of FIG. 1 and including circular marking means;

FIG. 5 is a perspective view of a crosspiece and adjustable compass which forms a part of the system of the present invention; and FIG. 6 is a partial perspective view taken as indicated at 6 of FIG. 1 and illustrating the cooperation of slide markers and parallel bars.

DESCRIPTION OF PREFERRED EMBODIMENT

Figure 1:
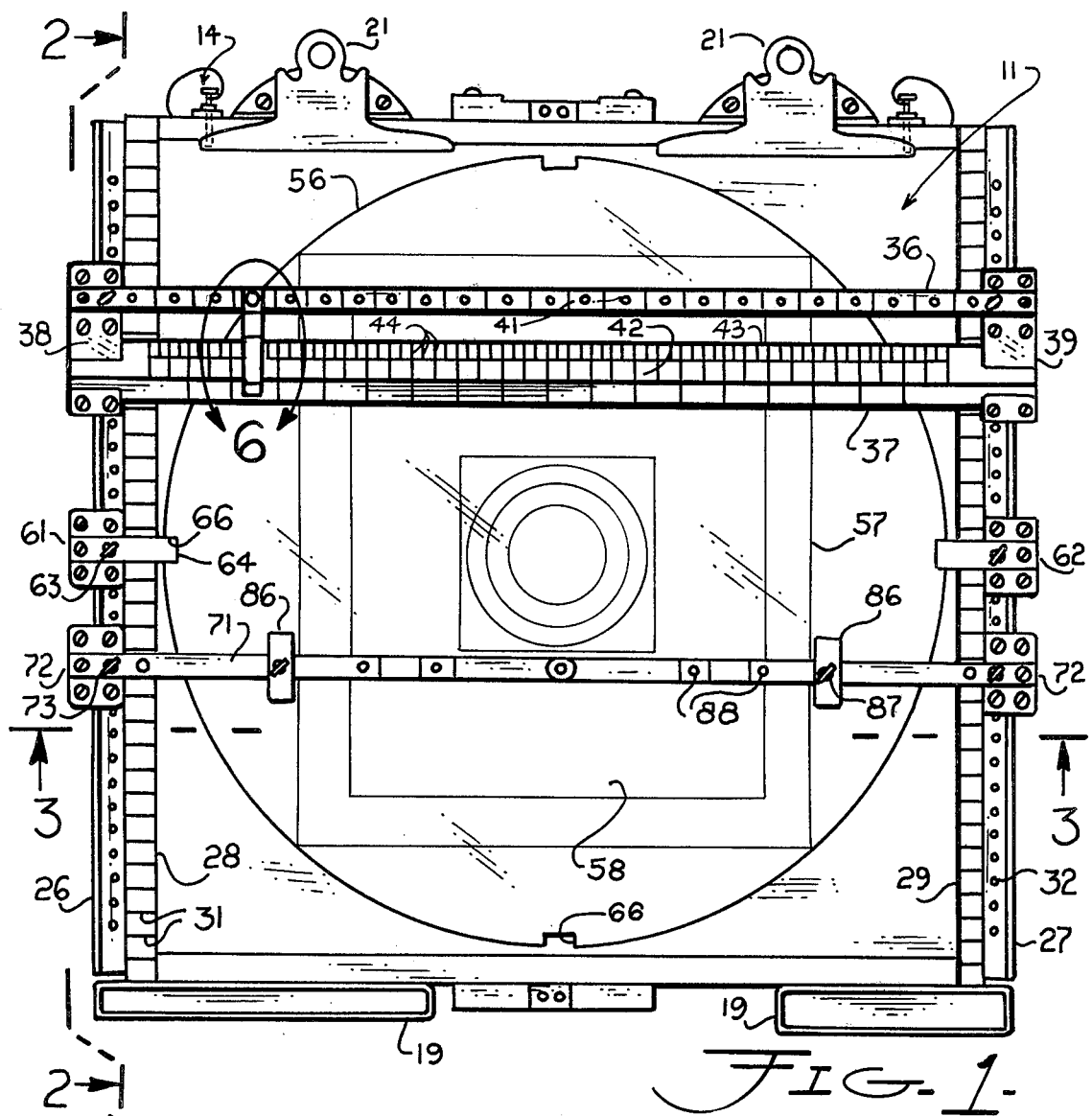
FIG. 1 is a top plan view of a ruling and marking device in accordance with the present invention.
Figure 2:
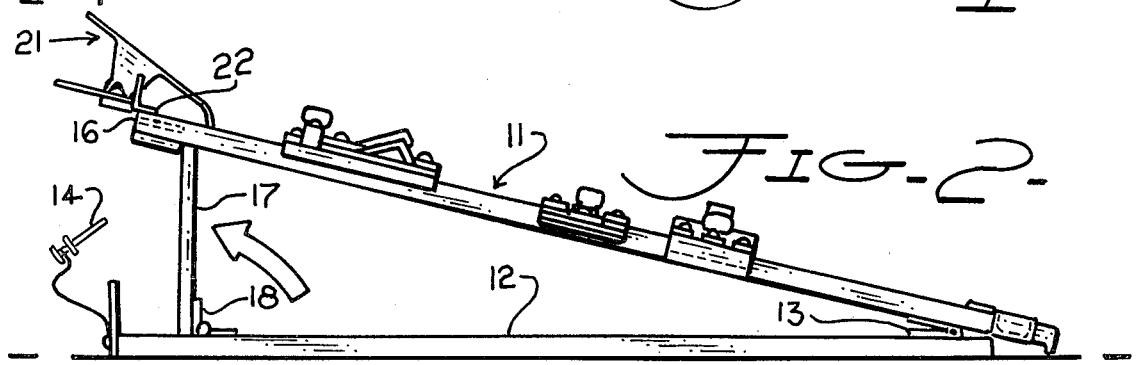
FIG. 2 is a side elevational view of the device of FIG. 1 pivoted into tilted position.
Figure 3:
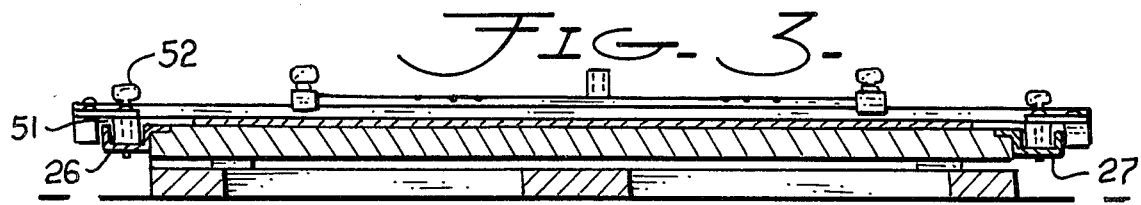
FIG. 3 is a vertical sectional view of the device of FIG. 1 folded into flat configuration and taken in the plane 3—3 of FIG. 1.

The present invention, as illustrated in FIGS. 1 to 3 will be seen to include a board 11 having a flat upper surface and mounted adjacent the bottom end thereof upon a flat frame 12 by a hinge 13. The board is adapted to normally lie flat upon the frame as illustrated in FIG. 3 and to be retained in such position by one or more locking pins 14 adapted to extend through an aperture in an upright on the top end of the frame and into a small bore 16 in the top end of the board 11. These pins may be removed to free the board to be tilted upwardly into the position in FIG. 2, for example, and may be protected from misplacement by attachment to the frame with a thread or line. A support plate 17 is mounted by a hinge 18 on top of the frame 12 beneath the board 11 and is adapted to be pivoted upwardly into the position of FIG. 2 against a stop on the underside of the board to thereby securely fix the board in tilted position for ready use. At the lower end of the board there may be provided recepticles 19 for removably receiving pencils, pens, erasers or the like. At the upper end of the board at the top thereof there are provided two spring loaded clamps or retainers 21 which may be of conventional construction and which each include a plate edge 22 against which paper is adapted to be placed for aligning paper with the clip open and retaining paper in such position with the clip closed.

Along the left and right sides of the board 11 there are provided tracks 26 and 27 respectively. The tracks may be formed in the same manner and in the illustrated embodiment each comprises a U-shaped channel having one side secured to the side edge of the board and along the top of the board adjacent each track there is provided a marking strip with the left strip being identified by the numeral 28 and the right strip by the numeral 29. These strips may be formed of metal or plastic and are divided longitudinally into equal increments of ½ inch, for example, with physically determinable indicia identifying each increment such as, for example, transverse grooves in the upper surface of the strips. The purpose and operation of the tracks and marking strips will become apparent from the following description of further elements of the present invention and operation thereof; however, it is additionally noted at this point that the tracks are provided with small apertures in the bottom thereof spaced apart a distance equal to the separation of the marks on the marking strips for fixing the position of elements adapted to move along the tracks.

There is provided as a further portion of the present invention a pair of parallel bars 36 and 37 having at left end thereof a first foot or carriage and at the right end thereof a second foot or carriage with these feet being adapted to slidably engage the tracks 26 and 27 alongside the board 11. The upper bar 36, which may for example have a rectangular cross-section, has physically identifiable marks spaced equidistant apart along the length thereof and these marks 41 may, for example, be provided as grooves extending across the top of the bar and spaced one-half an inch apart. The lower bar 37 preferably has a triangular cross-sectional configuration to present an inclined surface 42 facing the upper bar 36 with an edge 43 thereof spaced a predetermined distance from the upper bar and aligned with the undersurface of the upper bar at the top surface of the board 11. The lower bar 37 is also provided with measured marks spaced longitudinally thereacross providing divisions such as those of a ruler in alignment with the marks 41 on the upper bar 36 and these measuring marks 44 on the lower bar are also formed as by indenting or grooving the bar so as to be identifiable by feel by a blind person.

There is also provided on the parallel bars 36 and 37 a moveable marker 46 which is best illustrated in FIG. 6. This marker extends between the bars 36 and 37 and is adapted to be moved longitudinally thereof and to be removably fixed in alignment with the marks 41 on the upper bar 36. This marker may be formed with an offset upper end adapted to slidably fit over the top of the upper bar 36 and a relatively straight flat portion extending rearwardly therefrom to an inverted V-shaped rear portion slidably disposed atop the lower bar 37. The moveable marker 46 is adapted to be adjustably positioned along the parallel bars 36 and 37 and to this end there is shown to be provided a bore 47 in the upper surface of the upper bar 36 intermediate each of the marks 41 thereon and a moveable peg 48 having a narrow depending shank is disposed upon the forward U-shaped part of the moveable marker 46 with the shank extending through an opening therethrough and into a desired aperture 47 in the upper bar 36. The moveable marker 46 is dimensioned to dispose the left edge thereof in line with a mark 41 on the upper bar 36 when the peg 48 is inserted in one of the bar apertures 47. The peg may, of course, be attached to the moveable marker and a spring may be employed in the connection, if desired.

Considering now the feet or carriages 38 and 39 at the end of the parallel bars 36 and 37 it is first noted that same are adapted to slidably engage the tracks 26 and 27. The carriage 38, for example, may be formed of a rigid block of metal or plastic having a central longitudinal slot 51 on the underside thereof adapted to fit over the outer upright wall of the U-shaped track 26. The underside portion of the foot 38 preferrably fits the indentation in the track 26 so that the foot may be readily slid longitudinally of the track. The other foot or carriage 39 is similarly formed for slidable engagement with the track 27 on the opposite side of the board 11. These feet or carriages may be formed in a variety of ways and, in the illustrated embodiment, each are formed of a pair of parallel spaced blocks bolted to the underside of the top plate that may, for example, be provided in three sections. Each of the feet or carriages 38 and 39 is also provided with a bolt or the like 52 having an enlarged head and a shank slidably disposed through the foot for extension into one of the tracked apertures 32. This bolt in cooperation with a track aperture provides blocking means for the foot or carriage so that it may be fixed in desired position longitudinally of the board 11. It will, of course, be appreciated that the feet or carriages 38 and 39 are separated an appropriate distance to both slidably engage the respective tracks 26 and 27 alongside of the board.

It will be seen from the foregoing description of the present invention that the parallel bars 36 and 37 may be moved up and down the board to any desired position whereat they may be locked in extension across the board and thus across a sheet of paper clipped onto the upper surface of the board by retaining means 21. A person desiring to print, write, or otherwise mark the paper may do so between the parallel bars 36 and 37 and the slide marker 46 may be successively moved to provide equal increments of space laterally across the paper for successive marks or the like. This marker 46 also indicates the location of the last mark made upon the paper.

There is also provided, as a portion of the present invention, a flat circular disc 56 adapted to lie flat upon the upper surface of the board 11 and mounted for rotation thereon as by a short central stub shaft fitting into a bore in the center of the board. This disc 56 has a diameter substantially equal to the lateral distance between the marking strips 28 and 29 and carries upon the upper surface thereof a very thin, square frame 57 having a central opening dimensioned to receive a standard sized piece of paper 58 which may be retained therein as by masking tape (not shown).

The disc 56 is adapted to be turned on the board and there are provided disc locks 61 and 62 which may each may each take the form of a block adapted to fit into a track 26 or 27 at the center thereof and to be fixed thereof by a locking bolt 63 extending through the block into threaded engagement with an aperture at the center of the track. The block includes a lateral projection 64 adapted to mate with a radial indentation 66 and the disc 56. It is noted that a radial indentation 66 may be provided at each 90° of circumference of the disc in order that the disc may be locked in successive 90° rotated positions. The locking means may thus be considered quadrant locks in this particular arrangement.

The above-described disc arrangement provides for the ruling of perpendicular lines on paper mounted on the disc and also for the adjustment of the position of such lines by movement of the parallel bars 36 and 37.

The present invention additionally comprises means for drawing circles upon paper mounted on the upper surface of the board, either directly upon the board or upon the disc 56 thereon. These means include a crosspiece 71 adapted to extend laterally across the top of the board and having a foot 72 at each end thereof adapted to slide in the side tracks 26 and 27 of the board. Means for locking the crosspiece in desired position across the board may be provided by locking bolts 73 fitting through the feet 72 and adapted to enter one of the track apertures 32 at the desired location of the crosspiece.

At the center of the crosspiece 71 there is provided a short, upright shaft 74 adapted to mount a swing arm 76 as illustrated in FIGS. 4 and 5. The upright shaft 74 is threaded to receive a hollow threaded stub cylinder 77 for retaining the swing arm in pivotal contact with the crosspiece. The swing arm may be made extensible, as indicated in FIG. 5 if desired, and an apertured slide block 78 at the outer end thereof properly spaces the arm from the paper. A hollow cylinder 81 extends upwardly from the outer end of the swing arm 76 for receiving a pencil or the like 82 to extend the point of the pencil beneath the swing arm for drawing a circle or arc.

One manner of providing for drawing circles or arcs of different diameters is to provide an extensible and retractable swing arm 76, as noted above. A plurality of spaced bores or apertures 83 are provided vertically through the swing arm 76 and the arm may be adjusted in length by providing same as two separate strips overlying each other and having bolts 84 threaded through the apertures 83, as illustrated in FIG. 5. Alternatively, it is possible to provide for attaching the vertical hollow cylinder 81 at separate apertures 82 in order to vary the diameter of a circle that may be drawn with the structure. The crosspiece 71 may also be provided with spacer blocks 86 which are adapted to be locked to the crosspiece by locking bolts 87 at spaced apertures 88 in the crosspiece.

It is believed that the operation of the present invention is relatively apparent from the foregoing description of the structure thereof. It is, however, noted that the disc 56 may be removed or inserted as desired for the particular marking operation to be performed. With the disc mounted upon the upper surface of the board 11 the angular position of the disc is fixed by rotating the disc until the two side indentations 66 are aligned with the projection 64 on the disc locks 61 and 62 which have, in turn, been located at the center of the tracks. The lock bolts 63 are then tightened to depress the projection 64 into the disc indentation 66 so as to fix the angular position of the disc. Additional notches may be provided along the outer edge of the tracks 26 and 27 to assist a blind person in locating the disc locks and both the parallel bars and crosspiece. Such marks may be spaced rather widely apart in order to assist the user in determining the proper area of the board and then, for certain applications, counting the marks 31 on the marker strips 28 and 29. The present invention will be appreciated to be applicable for operations such as ruling, marking, writing, printing, drawing of arcs, circles, crosshatching, squaring of circles and, in fact, a wide variety of marking, ruling and drafting operations all for the purpose of materially expanding the capabilities of a blind person to communicate and express himself on paper.

It will, of course, be appreciated by those skilled in the art, that numerous modifications and variations of the present invention are possible within the scope of the invention and thus it is not intended to limit this invention to the precise details of illustration or terms of description.

What is claimed is:

1. A marking device for the blind comprising
    a board having a flat upper surface with tracks disposed one along each lateral side and distance indicators along each lateral side having physically raised or depressed marks for identification by touch,
    a pair of parallel spaced bars adapted to extend laterally across the upper surface of said board and having a foot at each end connecting said bars and slidably engaging a track whereby said bars are movable together on said board, the upper bar of said pair of bars having marks equally spaced longitudinally thereof that are raised or indented to be identifyable by touch,
    the lower bar of said pair of bars having an inclined surface facing said upper bar and extending from the board surface to an edge formed by another surface of said bar, said inclined surface having graduations thereon identifyable by touch,
    a movable marker slidably engaging said upper bar of said pair of bars and extending between said bars on the board surface over said lower bar inclined surface an at least partially over said another surface for sliding along said inclined surface and including releasable locking means engaging said upper bar for fixing said marker in alignment with one of the marks on said upper bar, and
    locking means on said feet cooperating with said tracks for releasably fixing said bars in alignment with said distance indicators along the side of said board.

2. The device of claim 1 further defined by a flat disc removably disposed upon the upper surface of said board for rotation about the axis thereof which is perpendicular to said upper surface and having peripheral indentations disposed at ninty degree separations for cooperation with disc locks adapted for disposition in said tracks.

3. The device of claim 1 further defined by a crosspiece having a foot at each end adapted to slidably engage said tracks and a controllably extensible swing arm pivotally mounted on said crosspiece and having means for receiving a marker for the drawing of circles.

* * * * *